United States Patent
Gschwind et al.

(10) Patent No.: US 10,331,565 B2
(45) Date of Patent: Jun. 25, 2019

(54) TRANSACTIONAL MEMORY SYSTEM INCLUDING CACHE VERSIONING ARCHITECTURE TO IMPLEMENT NESTED TRANSACTIONS

(71) Applicant: International Business Machines Corporation, Armonk, NY (US)

(72) Inventors: Michael Karl Gschwind, Chappaqua, NY (US); Valentina Salapura, Chappaqua, NY (US); Eric M. Schwarz, Gardiner, NY (US); Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 189 days.

(21) Appl. No.: 15/168,615

(22) Filed: May 31, 2016

(65) Prior Publication Data

US 2017/0242796 A1 Aug. 24, 2017

Related U.S. Application Data

(63) Continuation of application No. 15/050,926, filed on Feb. 23, 2016.

(51) Int. Cl.
*G06F 9/46* (2006.01)
*G06F 12/0842* (2016.01)
(Continued)

(52) U.S. Cl.
CPC .......... *G06F 12/0842* (2013.01); *G06F 9/466* (2013.01); *G06F 9/50* (2013.01);
(Continued)

(58) Field of Classification Search
None
See application file for complete search history.

(56) References Cited

U.S. PATENT DOCUMENTS 5,701,480 A * 12/1997 Raz .......................... G06F 9/466
714/19
6,349,361 B1  2/2002 Altman et al.
(Continued)

OTHER PUBLICATIONS

Cooperation, Intel. "Intel Architecture Instruction Set Extensions Programming Reference." Intel Corp., Mountain View, CA, USA, Tech. Rep (2012): 319433-012.
(Continued)

*Primary Examiner* — Sean D Rossiter
*Assistant Examiner* — Stephanie Wu
(74) *Attorney, Agent, or Firm* — Cantor Colburn LLP; Steven Chiu

(57) ABSTRACT

A computer system includes transactional memory to implement a nested transaction. The computer system generates a plurality of speculative identification numbers (IDs), identifies at least one of a software thread executed by a hardware processor and a memory operation performed in accordance with an application code. The computer system assigns at least one speculative cache version to a requested transaction based on a corresponding software thread. The speculative ID of the corresponding software thread identifies the speculative cache version. The computer system also identifies a nested transaction in the memory unit, assigns a cache version to the nested transaction, detects a conflict with the nested transaction, determines a conflicted nesting level of the nested transaction, and determines a cache version corresponding to the conflicted nesting level. The computer system also invalidates the cache version corresponding to the conflicted nesting level.

6 Claims, 10 Drawing Sheets

(51) Int. Cl.
  *G06F 16/23* (2019.01)
  *G06F 9/50* (2006.01)
(52) U.S. Cl.
  CPC .. *G06F 16/2308* (2019.01); *G06F 2212/1016* (2013.01); *G06F 2221/0795* (2013.01)

(56) References Cited

U.S. PATENT DOCUMENTS

| | | | |
|---|---|---|---|
| 6,457,065 B1* | 9/2002 | Rich | G06F 9/466 |
| | | | 707/E17.005 |
| 8,495,607 B2 | 7/2013 | Gschwind | |
| 8,635,492 B2 | 1/2014 | Gara et al. | |
| 9,146,774 B2 | 9/2015 | Busaba et al. | |
| 2008/0120300 A1* | 5/2008 | Detlefs | G06F 9/3842 |
| 2008/0244354 A1 | 10/2008 | Wu et al. | |
| 2009/0172641 A1* | 7/2009 | Wong | G06F 12/0246 |
| | | | 717/122 |
| 2011/0047334 A1* | 2/2011 | Eichenberger | G06F 11/1405 |
| | | | 711/141 |

OTHER PUBLICATIONS

International Business Machines Corporation. "z/Architecture, Principles of Operation." Tenth Edition, SA22-7832-09 (2012).

Jacobi et al. "Transactional memory architecture and implementation for IBM System z." Proceedings of the 2012 45th Annual IEEE/ACM International Symposium on Microarchitecture. IEEE Computer Society, 2012: 25-36.

List of IBM Patents or Patent Applications Treated as Related; (Appendix P), Filed May 31, 2016; 2 pages.

McDonald, Austen. Architectures for transactional memory. Stanford University, 2009. (161 pages).

P. Mak et al. "IBM system z10 processor cache subsystem microarchitecture." IBM Journal of Research and Development 53.1 (2009). (12 pages).

* cited by examiner

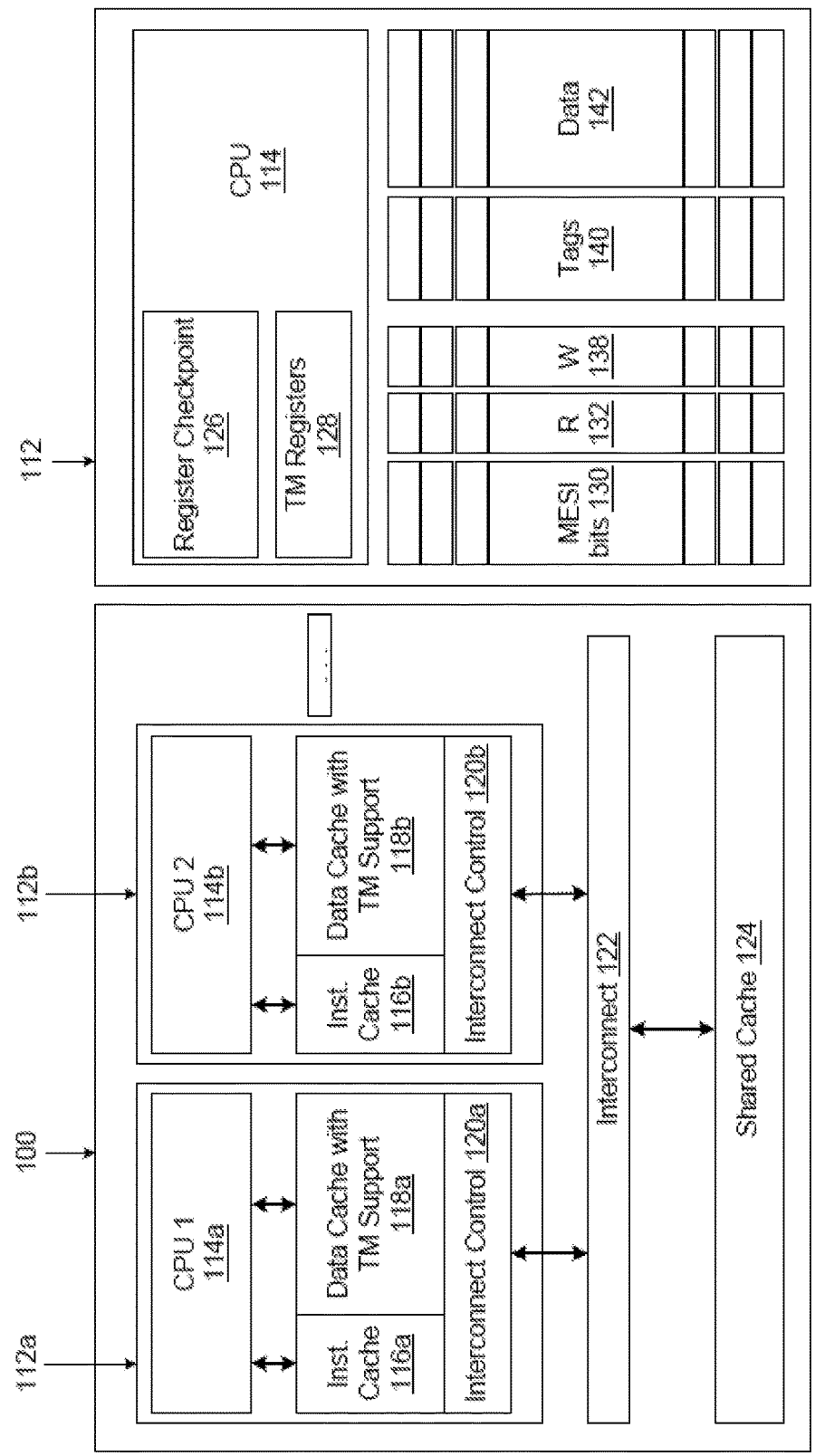

TABLE 1

Transactional Memory Design Space

|  | VERSIONING | |
| --- | --- | --- |
|  | Lazy | Eager |
| Optimistic (Conflict Detection) | Storing updates in a write buffer; detecting conflicts at commit time. | Not practical: waiting to update memory until commit time but detecting conflicts at access time guarantees wasted work and provides no advantage |
| Pessimistic (Conflict Detection) | Storing updates in a writebuffer; detecting conflicts at access time. | Updating memory, keeping old values in undo log; detecting conflicts at access time. |

FIG. 3

TRANSACTIONAL MEMORY SYSTEM INCLUDING CACHE VERSIONING ARCHITECTURE TO IMPLEMENT NESTED TRANSACTIONS

DOMESTIC PRIORITY

This application is a continuation of U.S. patent application Ser. No. 15/050,926, filed Feb. 23, 2016, the disclosure of which is incorporated by reference herein in its entirety.

BACKGROUND

This present disclosure relates generally to transactional memory systems, and more specifically, to a transactional memory system implementing nested transactions.

The number of central processing unit (CPU) cores on a chip and the number of CPU cores connected to a shared memory continue to grow significantly to support growing workload capacity demand. The increasing number of CPUs cooperating to process the same workloads puts a significant burden on software scalability. For example, shared queues or data-structures protected by traditional semaphores have become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Implementations of hardware Transactional Memory (HTM, or in this discussion, simply TM) systems have been introduced to counter the burden on software scalability that has emerged as a result to support growing workload capacity demand. Transaction memory systems utilize a group of instructions—typically referred to as a transaction—to operate in an atomic manner on a data structure in memory, as viewed by other central processing units (CPUs) and the I/O subsystem (atomic operation is also known as "block concurrent" or "serialized" in other literature). During operation, a transaction executes optimistically without obtaining a lock, but may need to abort and retry the transaction execution if an operation, of the executing transaction, on a memory location conflicts with another operation on the same memory location. Previously, software transactional memory implementations have been proposed to support software Transactional Memory (TM). However, hardware TM can provide improved performance aspects and ease of use over software TM.

Multiprocessing systems have been employed to offer selective pairing of processor cores for increased processing reliability. A selective pairing facility is provided that selectively connects, i.e., pairs, multiple microprocessor or processor cores to provide a highly reliable thread (or thread group). Each paired microprocessor or processor cores provides a highly reliable thread for high-reliability connection with system components such as a memory hierarchy, an optional system controller, and optional interrupt controller, optional I/O or peripheral devices, etc. Each processor core includes a transactional execution facility, wherein the system is configured to enable processor rollback to a previous state responsive to a transaction abort, e.g., either in order to recover from transaction interference when an incorrect execution has been detected due to interference from another memory operation not corresponding to the transaction, or a transaction abort instruction.

Recent trends in transactional memory architecture have led to a desire to incorporate nested transactions. Conventional implementations of nesting employ a "flattened nesting" technique, where multiple levels of nested transactions are combined into a single level, i.e., a single transaction. In such an embodiment, nesting is only used to track when the "super-transaction" that subsumes all nested transactions (which are flattened into the super-transaction) ends. Consequently an unnecessarily large rollback results when an interference is detected with a nested transaction because the entire super-transaction is rolled back rather than only the inferior transactions (i.e., nested transaction).

SUMMARY

According to a non-limiting embodiment, a computer system includes transactional memory to implement a nested transaction. The computer system generates a plurality of speculative identification numbers (IDs), identifies at least one of a software thread executed by a hardware processor and a memory operation performed in accordance with application code. The computer system assigns at least one speculative cache version to a requested transaction based on a corresponding software thread. The speculative ID of the corresponding software thread identifies the speculative cache version. The computer system also identifies a nested transaction in the memory unit, assigns a cache version to the nested transaction, detects a conflict with the nested transaction, determines a conflicted nesting level of the nested transaction, and determines a cache version corresponding to the conflicted nesting level. The computer system also invalidates the cache version corresponding to the conflicted nesting level.

According to another non-limiting embodiment, a method of implementing a nested transaction in transactional memory comprises identifying at least one nested transaction in a memory unit, and assigning a cache version to the at least one nested transaction. The method further includes detecting a conflict with the at least one nested transaction, determining a conflicted nesting level of the at least one nested transaction, and determining a cache version corresponding to the conflicted nesting level. The method further includes invalidating the cache version corresponding to the conflicted nesting level.

According to still another non-limiting embodiment, a computer program product controls an electronic device to implement a nested transaction in transactional memory. The computer program product comprises a computer readable storage medium having program instructions embodied therewith. The program instructions are executable by an electronic computer processor to control the electronic device to perform operations including identifying at least one nested transaction in a memory unit, and assigning a cache version to the at least one nested transaction. The operations further include detecting a conflict with the at least one nested transaction, determining a conflicted nesting level of the at least one nested transaction, and determining a cache version corresponding to the conflicted nesting level. The instructions further include invalidating the cache version corresponding to the conflicted nesting level.

Additional features are realized through the techniques of the present invention. Other embodiments are described in detail herein and are considered a part of the claimed invention. For a better understanding of the invention with the features, refer to the description and to the drawings.

BRIEF DESCRIPTION OF THE DRAWINGS

FIGS. 1 depicts an example of a multicore transactional memory environment including a plurality of Transactional Memory enabled (TM-enabled) CPUs on a die in accordance with a non-limiting embodiment;

FIG. 2A depicts an example of a transactional CPU environment including a CPU having additions to support TM;

FIG. 3 is a table illustrating examples of transactional memory architectures;

DETAILED DESCRIPTION

Figure 2B:
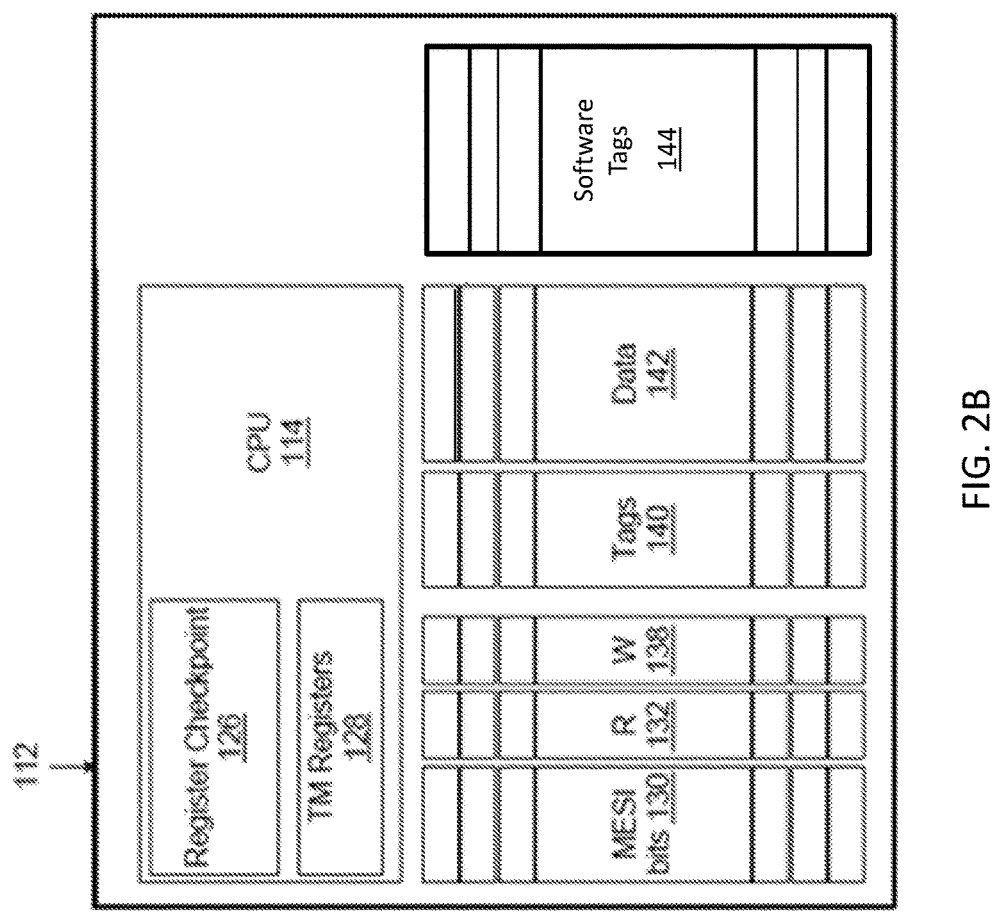
FIG. 2B depicts another example of a transactional CPU environment including a CPU having additions to support TM and software managed tags such that data can be written to a cache in a speculative manner and each speculative cache line in is associated with a software tag.

A conventional cache stores most recently accessed data (e.g., read or write accessed data). In the absence of transactions, i.e., when data is read/write-accessed, such accesses are final. That is, when the read or written is complete, a read access has read a value which provided it to the processor to read, and a write-access has permanently written a value to memory which alters one or more data items in memory.

In contrast, at least one embodiment of the invention provides caches that can also store and track speculatively read and written data. Speculative data are associated with a "speculative ID" which is provided for each access when a software thread is in a speculative state. While a software thread is in a speculative state, all operations are performed speculatively. A speculative operation refers to the ability to "undo" a change, also known as roll back. Roll back occurs when speculation has led to a condition that is best resolved by restarting at least a portion of work. One such condition that may be resolved by roll back is a synchronization failure of a nested transaction.

In accordance with at least one non-limiting embodiment of the present invention, synchronization failures of nested transactions are resolved by rolling back at least one transaction. A transaction is a sequence of memory accesses that are to be executed atomically, i.e., without interference from other system actors such as, for example, other transactions, or memory accesses outside transactions. A cache implementation according to at least one embodiment provides two mechanisms: 1—to roll back speculative memory accesses, and 2—to identify interference.

In order to roll back speculative updates, when data is write-accessed during a speculative software thread state, a new version is created. To this end, a new cache line is allocated and initialized to the previous memory state corresponding to the allocated line. The cache line is then indicated to have been updated speculatively, and in accordance with a cache architecture supporting the present invention, a speculative ID is associated with that line. In at least one embodiment, the speculative ID is leveraged and utilized as a cache tag version. Accordingly, software may be used to perform management of transaction creation, interference determination, rollback and completion. In at least one embodiment, a hybrid management scheme may be implemented where version management and interference is performed by hardware. For example, software threads manage at least one of transaction creation, interference determination, rollback and completion, while circuit logic operatively coupled to the data cache implements operations of detecting the conflict with the at least one nested transaction, determining a conflicted nesting level of the at least one nested transaction and/or determining a cache version corresponding to the conflicted nesting level. The hardware may then invalidate the cache version corresponding to the conflicted nesting level, optionally responsive to a software command to effect the invalidating.

Since a speculated cache line is created with the intention to allow for a roll back if necessary, it is intended to refrain from immediately writing a speculative cache line to main memory from the cache. Consequently, a software thread can write a plurality of lines into the cache that are associated with speculation. These software threads, however, may be limited by the cache capacity and when a speculative version of a line cannot be stored such that an error will be indicated.

According to a non-limiting embodiment, a speculative cache version can either be invalidated (flushed), or committed. If a speculative sequence (referred to here as means for implementing a transaction in accordance with the present invention) failed, the transaction is rolled back. To this end, all speculative cache versions associated with speculative sequence are invalidated from the cache. Because no speculative updates have been written to memory, no further actions are needed in the cache. (However, in the processor core, register values must be restored, and execution must be restarted at the beginning of the speculative sequence that has been invalidated.). Conversely, if the speculative sequence (transaction) succeeds, the data is committed. Accordingly, the ID indicating the cache data is speculative is removed from all speculative cache lines, as is the speculative ID which indicates the cache version, and data can be written back to memory.

Speculative IDs are also used to identify interference by tracking read and write accesses associated with a speculative ID, and indicating a possible interference when two possibly incompatible operations are performed. In at least one embodiment, the ultimate determination can be done by software-given specific schemes. Thus, when a line is marked as being speculatively written (also known as being part of a transaction's write set), and it is requested by to be accessed (e.g., read/write-accessed) by another transaction, or by a non-speculative operation corresponding to another thread, an interference is indicated. Read and write accesses by the speculative sequence with the same cache version, as indicated by the speculative ID, are permitted.

Similarly, in at least one embodiment, each line that has been read may be marked with the ID of the reader thread (also known as being part of a transactions read set). Because it is safe to have multiple readers to the same line, a cache line may be able to store multiple IDs. In at least one embodiment, multiple IDs may be stored using, for example, by providing multiple fields for read access, or by providing a bitmap, indicating which of the up to 128 IDs have performed a read access to a cache line. When a line is write-accessed and it has been read accessed by another speculative ID, an interference is indicated. Accordingly, when a speculative sequence is either aborted or committed all information about speculative IDs is cleared, as the data has either been committed to memory, and the sequence completed, or the information has been cleared.

Various non-limiting embodiments of the invention provide a transactional memory system including cache versioning architecture to implement nested transaction. In at least one embodiment, a cache tagging architecture with software-managed tags is used to implemented true nested transactions. In accordance with at least one embodiment, each nested transaction is assigned a cache version and cache version tag. When an interference is detected with a transaction, that transaction and all its inferior transactions (i.e., those that have already completed or are currently in progress) are invalidated. In this manner, conventional unnecessary large rollbacks that rollback an entire super-transaction can be replaced with a more precise rollback is performed where only an inferior nest (e.g., the faulty nest) among the full nest is rolled back.

With reference now to FIGS. 1-2, an example of a multicore TM environment is illustrated according to a non-limiting embodiment. Various TM designs for implementing both versioning detection and conflict detection may be employed including, but not limited to, Eager-Pessimistic (EP), Eager-Optimistic (EO), Lazy-Pessimistic (LP), and Lazy-Optimistic (LO). The table (Table 1) illustrated in FIG. 3, for example, describes various TM designs as understood by one of ordinary skill in the art.

FIG. 1, for example, shows many TM-enabled CPUs (CPU1 114a, CPU2 114b, etc.) on one die 100, connected with an interconnect 122, under management of an interconnect control 120a, 120b. Each CPU 114a, 114b (also known as a Processor) may have a split cache consisting of an instruction cache 116a, 166b for caching instructions from memory to be executed and a data cache 118a, 118b with TM support for caching data (operands) of memory locations to be operated on by CPU 114a, 114b (referring to FIG. 1, each CPU 114a, 114b and its associated caches are referenced as 112a, 112b). In an implementation, caches of multiple dies 100 are interconnected to support cache coherency between the caches of the multiple dies 100. In an implementation, a single cache, rather than the split cache is employed holding both instructions and data. In implementations, the CPU caches are one level of caching in a hierarchical cache structure. For example each die 100 may employ a shared cache 124 to be shared amongst all the CPUs on the die 100. In another implementation, each die may have access to a shared cache 124, shared amongst all the processors of all the dies 100.

Referring to FIG. 2, an example transactional CPU environment 112, having a CPU 114, including additions to support TM is illustrated in greater detail. The transactional CPU (processor) 114 may include hardware for supporting Register Checkpoints 126 and special TM Registers 128. The transactional CPU cache may have the MESI bits 130, Tags 140 and Data 142 of a conventional cache but also, for example, R bits 132 showing a line has been read by the CPU 114 while executing a transaction and W bits 138 showing a line has been written-to by the CPU 114 while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers. Although great effort has been expended to remove many un-needed barriers, such techniques are often complex and performance is typically far lower than that of HTMs.

Figure 4:
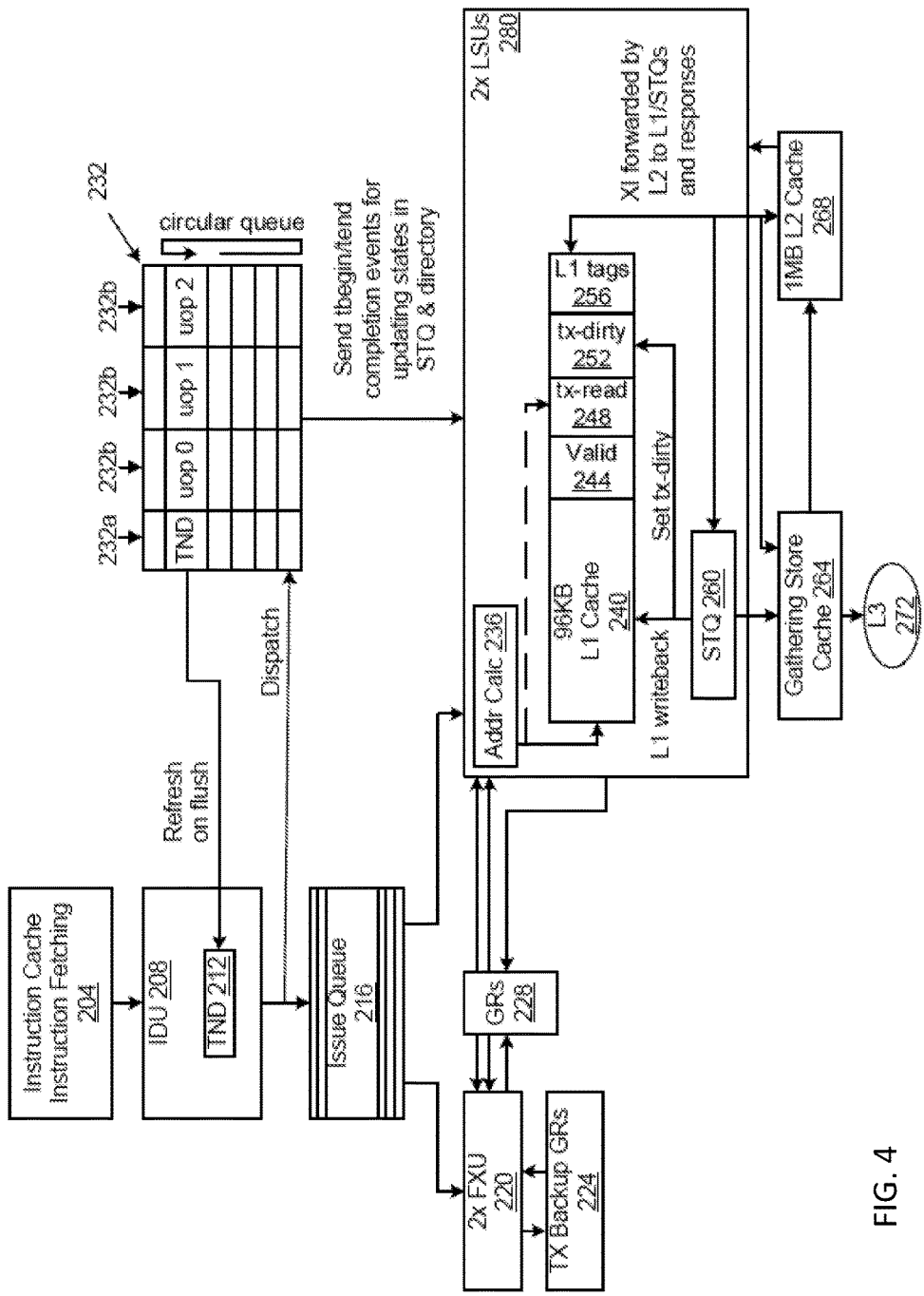
FIG. 4 depicts example components of an example CPU, in accordance with a non-limiting embodiment.

With reference to FIG. 4, the IBM zEnterprise EC12 processor introduced the transactional execution facility. The processor can decode 3 instructions per clock cycle; simple instructions are dispatched as single micro-ops, and more complex instructions are cracked into multiple micro-ops. The micro-ops (Uops 232b) are written into a unified issue queue 216, from where they can be issued out-of-order. Up to two fixed-point, one floating-point, two load/store, and two branch instructions can execute every cycle. A Global Completion Table (GCT) 232 holds every micro-op 232b and a transaction nesting depth (TND) 232a. The GCT 232 is written in-order at decode time, tracks the execution status of each micro-op 232b, and completes instructions when all micro-ops 232b of the oldest instruction group have successfully executed.

The level 1 (L1) data cache 240 is a 96 KB (kilo-byte) 6-way associative cache with 256 byte cache-lines and 4 cycle use latency, coupled to a private 1 MB (mega-byte) 8-way associative 2nd-level (L2) data cache 268 with 7 cycles use-latency penalty for L1 240 misses. The L1 240 cache is the cache closest to a processor and Ln cache is a cache at the nth level of caching. Both L1 240 and L2 268 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to one-hundred and forty-four (144) cores (not all cores are available to run customer workload).

Coherency is managed with a variant of the MESI protocol. Cache-lines can be owned read-only (shared) or exclusive; the L1 240 and L2 268 are store-through and thus do not contain dirty lines. The L3 272 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 272, the L3 272 checks whether it owns the line, and if necessary sends an XI to the currently owning L2 268/L1 240 under that L3 272 to ensure coherency, before it returns the cache line to the requestor. If the request also misses the L3 272, the L3 272 sends a request to the L4 (not shown), which enforces coherency by sending XIs to all necessary L3s under that L4, and to the neighboring L4s. Then the L4 responds to the requesting L3 which forwards the response to the L2 268/L1 240.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected.

Still referring to FIG. 4, various components included in an example transactional execution environment, including a CPU and caches/components with which it interacts (such as those depicted in FIGS. 1 and 2) are illustrated. The instruction decode unit 208 (IDU) keeps track of the current transaction nesting depth 212 (TND). When the IDU 208 receives a TBEGIN instruction, the nesting depth 212 is incremented, and conversely decremented on TEND instructions. The nesting depth 212 is written into the GCT 232 for every dispatched instruction. When a TBEGIN or TEND is decoded on a speculative path that later gets flushed, the IDU's 208 nesting depth 212 is refreshed from the youngest GCT 232 entry that is not flushed. The transactional state is also written into the issue queue 216 for consumption by the execution units, mostly by the Load/Store Unit (LSU) 280, which also has an effective address calculator 236 is included in the LSU 280. The TBEGIN instruction may specify a transaction diagnostic block (TDB) for recording status information, should the transaction abort before reaching a TEND instruction.

Similar to the nesting depth, the IDU 208/GCT 232 collaboratively track the access register/floating-point register (AR/FPR) modification masks through the transaction nest; the IDU 208 can place an abort request into the GCT 232 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 232b (including, for example uop 0, uop 1, and uop 2) will be executed by one of the two fixed point units (FXUs) 220 to save a pair of GRs 228 into a special transaction-backup register file 224, that is used to later restore the GR 228 content in case of a transaction abort. Also the TBEGIN spawns micro-ops 232b to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 232b instructions; NTSTG (non-transactional store) is handled like a normal store except that it is marked as non-transactional in the issue queue 216 so that the LSU 280 can treat it appropriately. TEND is a no-op at execution time, the ending of the transaction is performed when TEND completes.

As mentioned, instructions that are within a transaction are marked as such in the issue queue 216, but otherwise execute mostly unchanged; the LSU 280 performs isolation tracking as described in the next section.

Since decoding is in-order, and since the IDU 208 keeps track of the current transactional state and writes it into the issue queue 216 along with every instruction from the transaction, execution of TBEGIN, TEND, and instructions before, within, and after the transaction can be performed out of order. It is even possible (though unlikely) that TEND is executed first, then the entire transaction, and lastly the TBEGIN executes. Program order is restored through the GCT 232 at completion time. The length of transactions is not limited by the size of the GCT 232, since general purpose registers (GRs) 228 can be restored from the backup register file 224.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit 280 tracks cache lines that were accessed during transactional execution, and triggers an abort if an XI from another CPU (or an LRU-XI) conflicts with the footprint. If the conflicting XI is an exclusive or demote XI, the LSU 280 rejects the XI back to the L3 272 in the hope of finishing the transaction before the L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 240 is traditionally implemented with static random access memories (SRAMs). For the transactional memory implementation, the valid bits 244 (64 rows×6 ways) of the directory have been moved into normal logic latches, and are supplemented with two more bits per cache line: the TX-read 248 and TX-dirty 252 bits.

The TX-read 248 bits are reset when a new outermost TBEGIN is decoded (which is interlocked against a prior still pending transaction). The TX-read 248 bit is set at execution time by every load instruction that is marked "transactional" in the issue queue. Note that this can lead to over-marking if speculative loads are executed, for example on a mispredicted branch path. The alternative of setting the TX-read 248 bit at load completion time was too expensive for silicon area, since multiple loads can complete at the same time, requiring many read-ports on the load-queue.

Stores execute the same way as in non-transactional mode, but a transaction mark is placed in the store queue (STQ) 260 entry of the store instruction. At write-back time, when the data from the STQ 260 is written into the L1 240, the TX-dirty bit 252 in the L1-directory 256 is set for the written cache line. Store write-back into the L1 240 occurs only after the store instruction has completed, and at most one store is written back per cycle. Before completion and write-back, loads can access the data from the STQ 260 by means of store-forwarding; after write-back, the CPU 114 (see FIG. 2A) can access the speculatively updated data in the L1 240. If the transaction ends successfully, the TX-dirty bits 252 of all cache-lines are cleared, and also the TX-marks of not yet written stores are cleared in the STQ 260, effectively turning the pending stores into normal stores.

On a transaction abort, all pending transactional stores are invalidated from the STQ 260, even those already completed. All cache lines that were modified by the transaction in the L1 240, that is, have the TX-dirty bit 252 on, have their valid bits turned off, effectively removing them from the L1 240 cache instantaneously.

The architecture requires that before completing a new instruction, the isolation of the transaction read- and write-set is maintained. This isolation is ensured by stalling instruction completion at appropriate times when XIs are pending; speculative out of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 240 receives an XI, L1 240 accesses the directory to check validity of the XI'ed address in the L1 240, and if the TX-read bit 248 is active on the XI'ed line and the XI is not rejected, the LSU 280 triggers an abort. When a cache line with active TX-read bit 248 is LRU'ed from the L1 240, a special LRU-extension vector remembers for each of the 64 rows of the L1 240 that a TX-read line existed on that row. Since no precise address tracking exists for the LRU extensions, any non-rejected XI that hits a valid extension row the LSU 280 triggers an abort. Providing the LRU-extension effectively increases the read footprint capability from the L1-size to the L2-size and associativity, provided no conflicts with other CPUs 114 (FIGS. 1 and 2) against the non-precise LRU-extension tracking causes an abort.

The store footprint is limited by the store cache size (the store cache is discussed in more detail below) and thus implicitly by the L2 268 size and associativity. No LRU-extension action needs to be performed when a TX-dirty 252 cache line is LRU'ed from the L1 240.

In prior systems, since the L1 240 and L2 268 are store-through caches, every store instruction causes an L3 272 store access; with now 6 cores per L3 272 and further improved performance of each core, the store rate for the L3 272 (and to a lesser extent for the L2 268) becomes problematic for certain workloads. In order to avoid store queuing delays, a gathering store cache 264 had to be added, that combines stores to neighboring addresses before sending them to the L3 272.

For transactional memory performance, it is acceptable to invalidate every TX-dirty 252 cache line from the L1 240 on transaction aborts, because the L2 268 cache is very close (7 cycles L1 240 miss penalty) to bring back the clean lines. However, it would be unacceptable for performance (and silicon area for tracking) to have transactional stores write the L2 268 before the transaction ends and then invalidate all dirty L2 268 cache lines on abort (or even worse on the shared L3 272).

The two problems of store bandwidth and transactional memory store handling can both be addressed with the gathering store cache 264. The cache 264 is a circular queue of 64 entries, each entry holding 128 bytes of data with byte-precise valid bits. In non-transactional operation, when a store is received from the LSU 280, the store cache 264 checks whether an entry exists for the same address, and if so gathers the new store into the existing entry. If no entry exists, a new entry is written into the queue, and if the number of free entries falls under a threshold, the oldest entries are written back to the L2 268 and L3 272 caches.

When a new outermost transaction begins, all existing entries in the store cache are marked closed so that no new stores can be gathered into them, and eviction of those entries to L2 268 and L3 272 is started. From that point on, the transactional stores coming out of the LSU 280 STQ 260 allocate new entries, or gather into existing transactional entries. The write-back of those stores into L2 268 and L3 272 is blocked, until the transaction ends successfully; at that point subsequent (post-transaction) stores can continue to gather into existing entries, until the next transaction closes those entries again.

The store cache 264 is queried on every exclusive or demote XI, and causes an XI reject if the XI compares to any active entry. If the core is not completing further instructions while continuously rejecting XIs, the transaction is aborted at a certain threshold to avoid hangs.

The LSU 280 requests a transaction abort when the store cache 264 overflows. The LSU 280 detects this condition when it tries to send a new store that cannot merge into an existing entry, and the entire store cache 264 is filled with stores from the current transaction. The store cache 264 is managed as a subset of the L2 268: while transactionally dirty lines can be evicted from the L1 240, they have to stay resident in the L2 268 throughout the transaction. The maximum store footprint is thus limited to the store cache size of 64×128 bytes, and it is also limited by the associativity of the L2 268. Since the L2 268 is 8-way associative and has 512 rows, it is typically large enough to not cause transaction aborts.

If a transaction aborts, the store cache 264 is notified and all entries holding transactional data are invalidated. The store cache 264 also has a mark per doubleword (8 bytes) whether the entry was written by a NTSTG instruction— those doublewords stay valid across transaction aborts.

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 238 to restore.

The CPU 114 supports a special millicode-only instruction to read out the backup-GRs 224 and copy them into the main GRs 228. The TBEGIN instruction address is also loaded from an SPR to set the new instruction address in a program status word (PSW) value to continue execution after the TBEGIN once the millicode abort sub-routine finishes. That PSW may later be saved as program-old PSW in case the abort is caused by a non-filtered program interruption.

The TABORT instruction may be millicode implemented; when the IDU 208 decodes TABORT, it instructs the instruction fetch unit to branch into TABORT' s millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR 228. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 114 (see FIG. 2A) to stop all conflicting work, retry the local transaction, before releasing the other CPUs 114 to continue normal processing. Multiple CPUs 114 must be coordinated to not cause deadlocks, so some serialization between millicode instances on different CPUs 114 is required.

The term "thread" is used herein. A thread can be either a hardware thread or a software thread. A hardware thread within a core processor includes a set of registers and logic for executing a software thread. The software thread is a segment of computer program code. Within a core, a hardware thread will have a thread number. For instance, a core may include four threads, numbered zero through three. Throughout a multiprocessor system, node chip software threads, i.e., software threads executed by a computing node, can be referred to using speculative identification numbers ("IDs"). In the present embodiment, there are 128 possible IDs for identifying software threads.

These threads can be the subject of "speculative execution," meaning that a thread or threads can be started as a sort of wager or gamble, without knowledge of whether the thread can complete successfully. A given thread cannot complete successfully if some other thread modifies the data that the given thread is using in such a way as to invalidate the given thread's results. The terms "speculative," "speculatively," "execute," and "execution" are terms of art in this context. These terms do not imply that any mental step or manual operation is occurring. All operations or steps described herein are to be understood as occurring in an automated fashion under control of computer hardware or software.

If speculation fails, the results must be invalidated and the thread must be re-run or some other workaround found. In at least one embodiment if a number of speculative versions exceeds a threshold value, all remaining transactions are flattened.

According to at least one embodiment, various speculative executions may be supported including, but not limited to, Speculative Execution (SE) (also referred to as Thread Level Speculative ("TLS")), Transactional Memory ("TM"), and Rollback which is a recovery operation specifically designed for the handling of soft errors).

In at least one embodiment, Speculative Execution (SE) is used to parallelize programs that have been written as sequential program. When the programmer writes this sequential program, she may insert commands to delimit sections to be executed concurrently. The compiler can recognize these sections and attempt to run them speculatively in parallel, detecting and correcting violations of sequential semantics.

When referring to threads in the context of Speculative Execution, the terms older/younger or earlier/later refer to their relative program order (not the time they actually run on the hardware). With respect to Speculative Execution, successive sections of sequential code are assigned to hardware threads to run simultaneously. Each thread has the illusion of performing its task in program order. It sees its own writes and writes that occurred earlier in the program. It does not see writes that take place later in program order even if (because of the concurrent execution) these writes have actually taken place earlier in time.

To sustain the illusion, the L2 gives threads private storage as needed, accessible by software thread ID. It allows threads to read their own writes and writes from threads earlier in program order, but isolates their reads from threads later in program order. Thus, the L2 might have several different data values for a single address. Each occupies an L2 way, and the L2 directory records, in addition to the usual directory information, a history of which thread IDs are associated with reads and writes of a line. A speculative write is not to be written out to main memory.

One situation that will break the program-order illusion is if a thread earlier in program order writes to an address that a thread later in program order has already read. The later thread should have read that data, but did not. The solution is to kill the later software thread and invalidate all the lines it has written in L2, and to repeat this for all younger threads. On the other hand, without such interference a thread can complete successfully, and its writes can move to external main memory when the line is cast out or flushed.

Not all threads need to be speculative. The running thread earliest in program order can be non-speculative and run conventionally; in particular its writes can go to external main memory. The threads later in program order are speculative and are subject to be killed. When the non-speculative thread completes, the next-oldest thread can be committed and it then starts to run non-speculatively.

The following sections describe the implementation of a speculative model in according to various non-limiting embodiments.

When a sequential program is decomposed into speculative tasks, the memory subsystem needs to be able to associate all memory requests with the corresponding task. This is done by assigning a unique ID at the start of a speculative task to the thread executing the task and attaching the ID as tag to all its requests sent to the memory subsystem. As the number of dynamic tasks can be very large, it may not be practical to guarantee uniqueness of IDs across the entire program run. It is sufficient to guarantee uniqueness for all IDs concurrently present in the memory system.

With reference to FIG. 2B, in accordance with at least one non-limiting embodiment of the invention, the transactional CPU environment includes software managed tags 144. In accordance with at least one implementation of software managed tags 144, data can be written to a cache in a speculative manner and each speculative cache line in is associated with a software tag 144. In accordance with an exemplary embodiment, each software tag 144 is obtained from a currently active tag register which may be set by software. In accordance with another aspect of the present invention, all cache lines may be marked as corresponding to speculative accesses with a specific tag 144.

In accordance with one hardware embodiment, when a read access is performed to a speculative cache line from a present processor, and the cache line is non-speculative, access is provided, and the cache line is marked as having been speculatively read with the active software tag 144. In accordance with one hardware embodiment, when a write-access is performed to a speculative cache line from a present processor, and the cache line is non-speculative, a new speculative cache line is installed and provide, and the cache line is marked as having being speculatively written with the active software tag 144.

When an access is performed to a cache line that is already associated with another software tag 144, then control is transferred to software which is responsible for resolving such a conflict. In at least one embodiment, multiple read accesses to a cache line are allowed, and multiple software tags 144 may be stored in conjunction with a cache read-access to a line. Similarly, when a remote access is performed, and the remote access references a cache line associated with a software tag 144, control may be passed to software. In at least one embodiment, the read access may be granted when a remote read access to a cache line is performed.

In accordance with conventional systems, a single tag may be used to indicate the cache lines associated to a transaction. In accordance with at least one embodiment of the invention, however, program logic for implementing true nesting is supplied as part of the programming of a true nesting transactional processing system. In this manner, distinct software tags 144 are assigned to each nesting level. Accordingly, the software managed tags 144 may be used to implement true nested transactions.

Transactions as defined for Transactional Memory ("TM") occur in response to a specific programmer request within a parallel program. Generally the programmer will put instructions in a program delimiting sections in which TM is desired. This may be done by marking the sections as requiring atomic execution. According to the PowerPC architecture: "An access is single-copy atomic, or simply "atomic", if it is always performed in its entirety with no visible fragmentation."

To enable a TM runtime system to use the TM supporting hardware, it needs to allocate a fraction of the hardware resources, particularly the speculative IDs that allow hardware to distinguish concurrently executed transactions, from the kernel (operating system), which acts as a manager of the hardware resources. The kernel configures the hardware to group IDs into sets called domains, configures each domain for its intended use, TLS, TM or Rollback, and assigns the domains to runtime system instances.

At the start of each transaction, the runtime system executes a function that allocates an ID from its domain, and programs it into a register that starts marking memory access as to be treated as speculative, i.e., revocable if necessary.

When the transaction section ends, the program will make another call that ultimately signals the hardware to do conflict checking and reporting. Based on the outcome of the check, all speculative accesses of the preceding section can be made permanent or removed from the system. In at least one embodiment, circuit logic operatively coupled to the data cache operates to detect a conflict with the at least one nested transaction, determine a conflicted nesting level of the at least one nested transaction, and/or determine a cache version corresponding to the conflicted nesting level, and then invalidates the cache version corresponding to the conflicted nesting level. The circuit logic may also optionally invalidate the cache version corresponding to the conflicted nesting level in response to a software command to effect the invalidating. The logic circuit operations described above may also be employed in conjunction with software implementations (e.g., software thread management operations) to provide a hybrid management transaction system not found in conventional management systems.

The PowerPC architecture defines an instruction pair known as larx/stcx. This instruction type can be viewed as a special case of TM. The larx/stcx pair will delimit a memory access request to a single address and set up a program section that ends with a request to check whether the instruction pair accessed the memory location without interfering access from another thread. If an access interfered, the memory modifying component of the pair is nullified and the thread is notified of the conflict More about a special implementation of larx/stcx instructions using reservation registers is to be found in co-pending application Ser. No. 12/697,799 filed Jan. 29, 2010, which is incorporated herein by reference. This special implementation uses an alternative approach to TM to implement these instructions. In any case, TM is a broader concept than larx/stcx. A TM section can delimit multiple loads and stores to multiple memory locations in any sequence, requesting a check on their success or failure and a reversal of their effects upon failure.

Rollback occurs in response to "soft errors", temporary changes in state of a logic circuit. Normally these errors occur in response to cosmic rays or alpha particles from solder balls. The memory changes caused by a programs section executed speculatively in rollback mode can be reverted and the core can, after a register state restore, replay the failed section.

Figure 5:
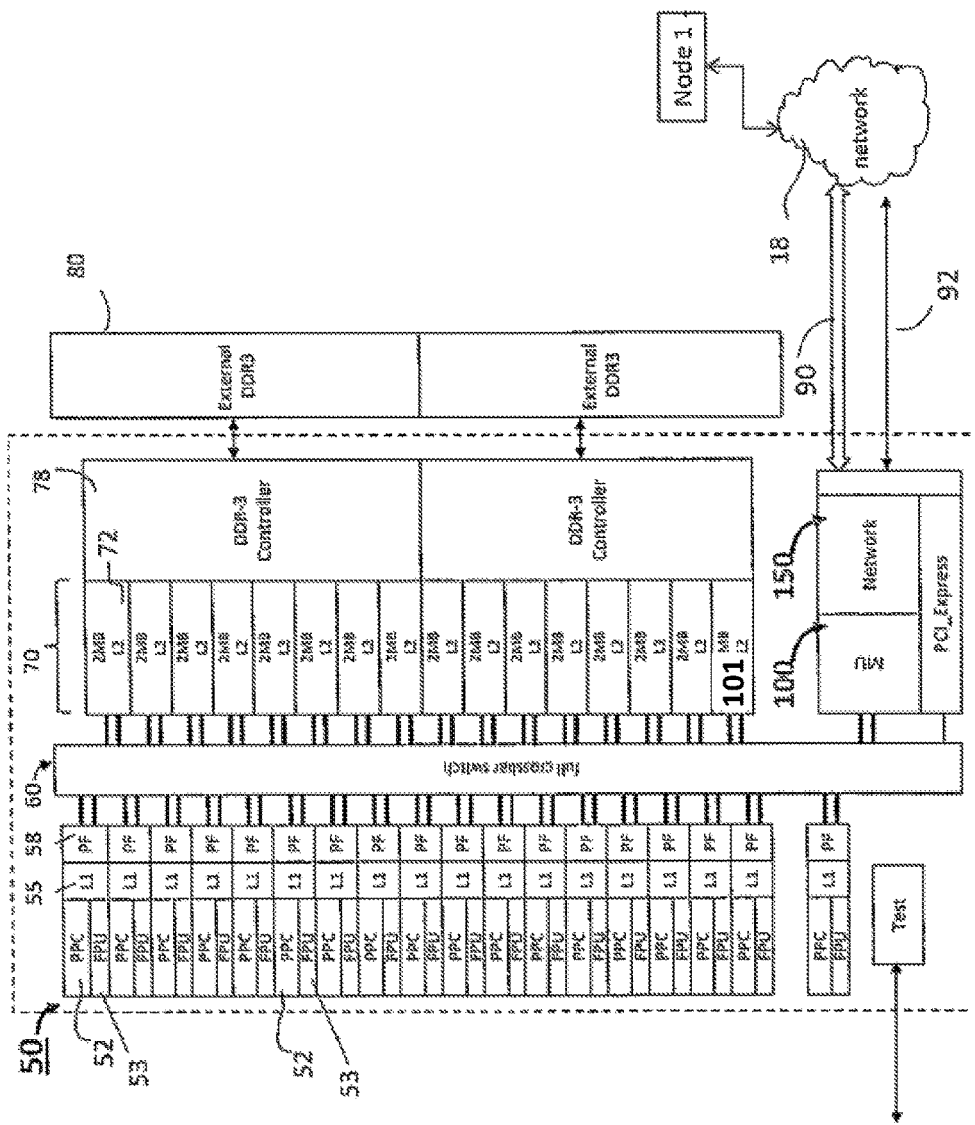
FIG. 5 illustrates an overall architecture of a multiprocessor computing node implemented in a parallel computing system capable of implementing transactional memory implementing nested transactions according to a non-limiting embodiment.

Referring now to FIG. 5, an overall architecture of a multiprocessor computing node 50, also referred to as a node chip 50, i.e., computing node 50, implemented in a parallel computing system in which the present embodiment may be implemented is illustrated according to a non-limiting embodiment. In at least one embodiment, the computing node 50 is a single chip ("node chip" 50) based on PowerPC cores, though the architecture can use any cores, and may comprise one or more semiconductor chips.

More particularly, the basic node chip 50 of the multiprocessor system illustrated in FIG. 5 includes (sixteen or seventeen) 16+1 symmetric multiprocessing (SMP) cores 52, each core being 4-way hardware threaded supporting transactional memory and thread level speculation, and, including a Quad Floating Point Unit (FPU) 53 associated with each core. The 16 cores 52 do the computational work for application programs.

The 17th core is configurable to carry out system tasks, such as reacting to network interface service interrupts, distributing network packets to other cores, taking timer interrupts, reacting to correctable error interrupts, taking statistics, initiating preventive measures, monitoring environmental status (temperature), and performing system throttling accordingly.

In other words, it offloads all the administrative tasks from the other cores to reduce the context switching overhead for these.

In one embodiment, there is provided 32 MB of shared L2 cache 70, accessible via crossbar switch 60. There is further provided external Double Data Rate Synchronous Dynamic Random Access Memory ("DDR SDRAM") 80, as a lower level in the memory hierarchy in communication with the L2. Herein, "low" and "high" with respect to memory will be taken to refer to a data flow from a processor to a main memory, with the processor being upstream or "high" and the main memory being downstream or "low."

Each FPU 53 associated with a core 52 has a data path to the L1-cache 55 of the CORE, allowing it to load or store from or into the L1-cache 55. The terms "L1" and "LID" will both be used herein to refer to the L1 data cache.

Each core 52 is directly connected to a supplementary processing agglomeration 58, which includes a private prefetch unit. For convenience, this agglomeration 58 will be referred to herein as "L1P"—meaning level 1 prefetch—or "prefetch unit;" but many additional functions are lumped together in this so-called prefetch unit, such as write combining. These additional functions could be illustrated as separate modules, but as a matter of drawing and nomenclature convenience the additional functions and the prefetch unit will be grouped together. This is a matter of drawing organization, not of substance. The L1P group also accepts, decodes and dispatches all requests sent out by the core 52.

By implementing a direct memory access ("DMA") engine referred to herein as a Messaging Unit ("MU") such as MU 101, with each MU 101 including a DMA engine and Network Card interface in communication with the XBAR switch, chip I/O functionality is provided. In one embodiment, the compute node further includes: intra-rack interprocessor links 90 which may be configurable as a 5-D torus; and, one I/O link 92 interfaced with the interfaced with the MU. The system node employs or is associated and interfaced with a 8-16 GB memory/node, also referred to herein as "main memory."

The term "multiprocessor system" is used herein. With respect to the present embodiment this term can refer to a node chip or it can refer to a plurality of node chips linked together. In the present embodiment, however, the management of speculation is conducted independently for each node chip. This might not be true for other embodiments, without taking those embodiments outside the scope of the claims.

The compute node chip implements a direct memory access engine DMA to offload the network interface. It transfers blocks via three switch master ports between the L2-cache slices 70 (see FIG. 5). It is controlled by the cores via memory mapped I/O access through an additional switch slave port. There are 16 individual slices, each of which is assigned to store a distinct subset of the physical memory lines. The actual physical memory addresses assigned to each cache slice are configurable, but static. The L2 has a line size such as 128 bytes. In the commercial embodiment this will be twice the width of an L1 line. L2 slices are set-associative, organized as 1024 sets, each with 16 ways. The L2 data store may be composed of embedded DRAM and the tag store may be composed of static RAM.

The L2 has ports, for instance a 256 b wide read data port, a 128 b wide write data port, and a request port. Ports may be shared by all processors through the crossbar switch 60.

In this embodiment, the L2 Cache units provide the bulk of the memory system caching on the BQC chip. Main memory may be accessed through two on-chip DDR-3SDRAM memory controllers 78, each of which services eight L2 slices.

The L2 slices may operate as set-associative caches while also supporting additional functions, such as memory speculation for Speculative Execution (SE), which includes different modes such as: Thread Level Speculations ("TLS"), Transactional Memory ("TM") and local memory rollback, as well as atomic memory transactions The L2 serves as the point of coherence for all processors. This function includes generating L1 invalidations when necessary. Because the L2 cache is inclusive of the L1s, it can remember which processors could possibly have a valid copy of every line, and slices can multicast selective invalidations to such processors.

Figure 6:
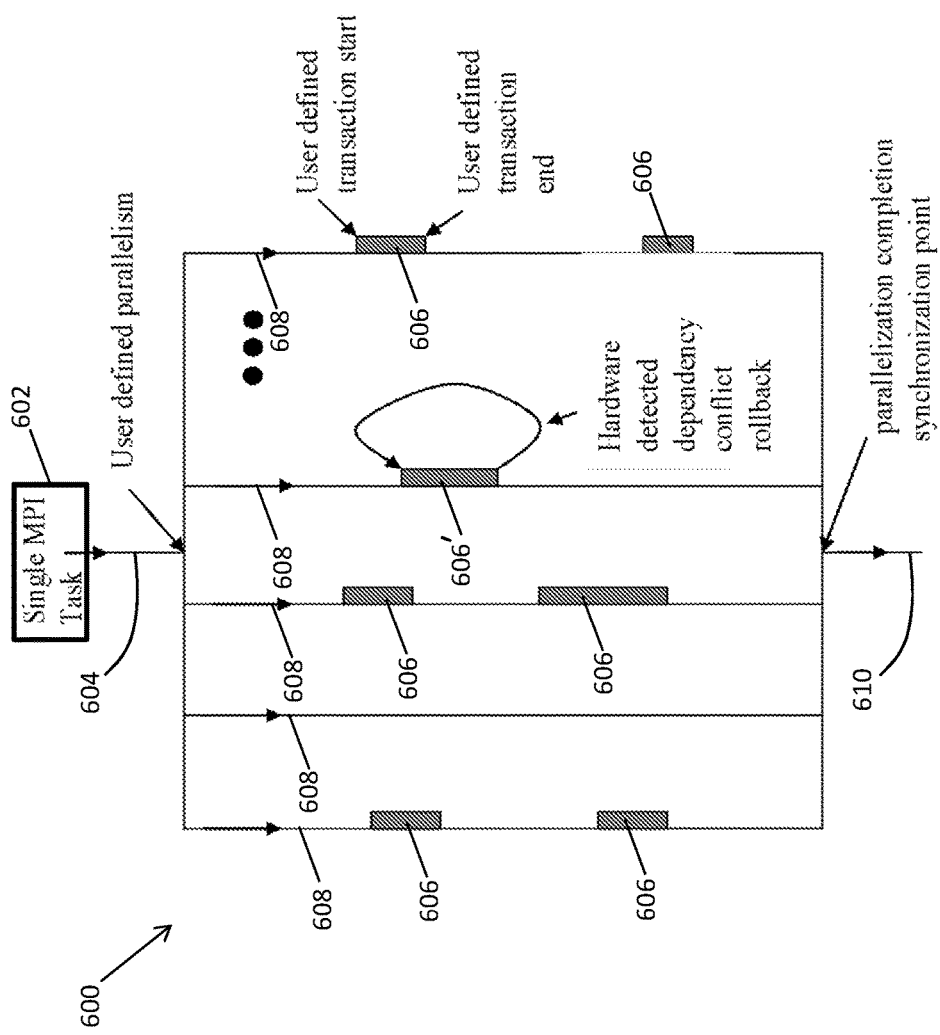
FIG. 6 is an example of a thread-level speculative and parallel execution architecture to manage data dependencies with cache multi-versioning according to a non-limiting embodiment.

Referring to FIG. 6, an example, of a thread-level speculative and parallel execution architecture 600 to manage data dependencies with cache multi-versioning is illustrated. A single task 602 including one or more transaction packets is delivered to a message passing interface (MPI) 604, and the transaction packets 606 of the task 602 are delivered to one or more threads 608 to be processed in parallel. In at least one embodiment, a user may define the parallelism scheme used to process the transaction packets 606. The transaction packets 606 are ultimately coalesced at a completion synchronization point and then output to an output MPI 610.

While performing the parallel execution, one or more transaction packets may experience a conflict. In at least one embodiment, the transactional memory system implementing nested transactions according to at least one embodiment includes hardware configured to detect one or more conflicted transaction packets 606'. According to at least one embodiment described below, a transaction monitoring scheme in a versioning cache is provided to roll back the conflicted transaction packet 606' without requiring a blanket "flattened nesting" rollback as discussed in greater detail below.

Figure 7:
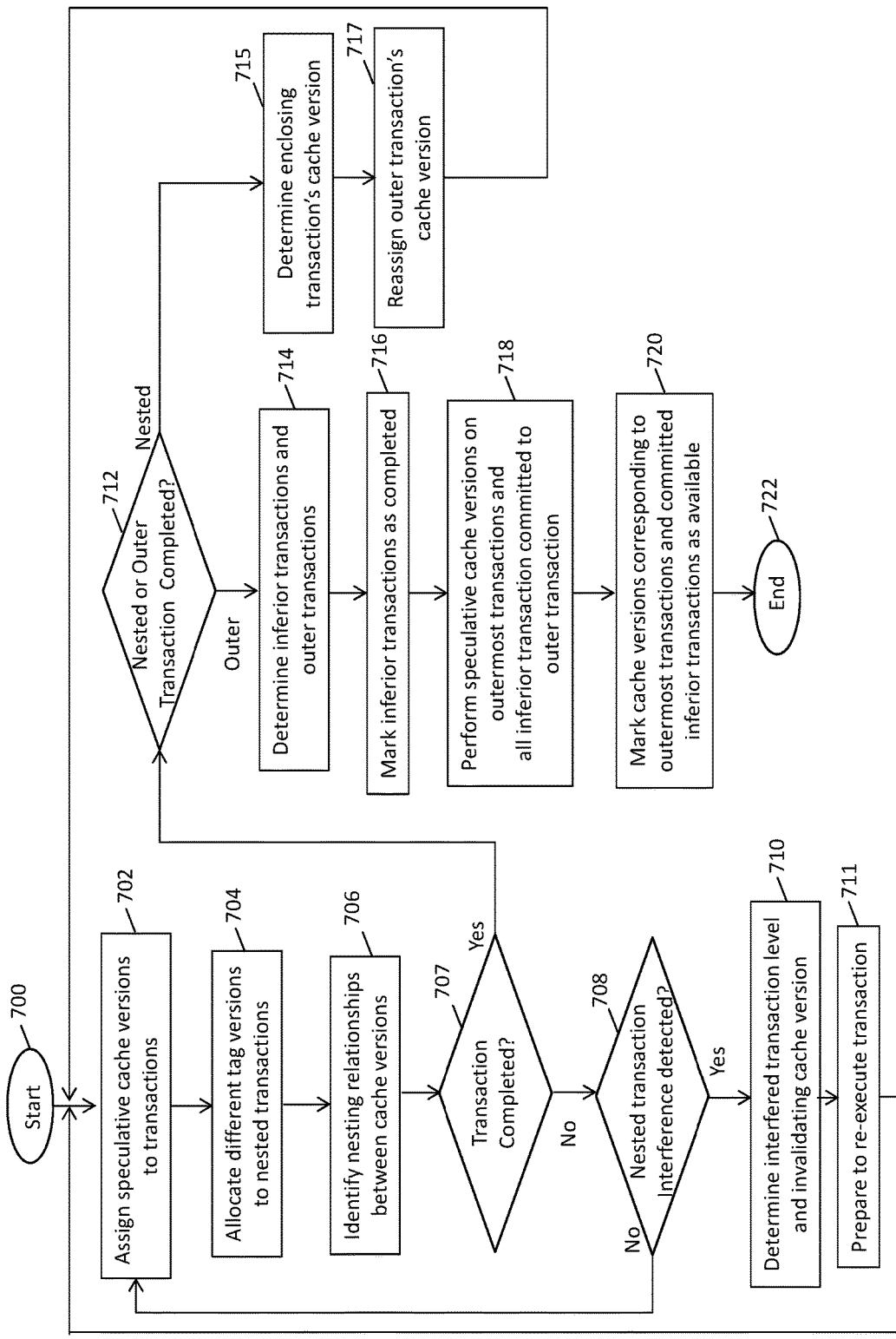
FIG. 7 is a flow diagram illustrating a method of implementing a nested transaction in transactional memory according to a non-limiting embodiment.

Turning now to FIG. 7, a method of implementing a nested transaction in transactional memory is illustrated according to a non-limiting embodiment using speculative identification numbers (e.g., "speculative IDs", "tags, or "version tags"). For example, one ID (i.e., speculative ID) from a possible 128 IDs may be utilized to identify software threads executed by the node chip 50, and memory operations performed in accordance with an application code. The method begins at operation 700, and at operation 702 speculative cache versions are assigned to one or more requested transactions. In at least one embodiment, speculative IDs (one of the speculative identification numbers of the node chip 50) are utilized to indicate cache tag versions. At operation 704, different cache tag versions (e.g., different speculative IDs) are allocated to nested transactions of the requested transactions. In at least one embodiment, the corresponding cache version is based on the cache tags assigned to the nested transactions. At operation 706, relationships between the identified nested transactions and the cache versions are recorded. Accordingly, relationships for future processing are made tangible and preserved. At operation 707, a determination is made as to whether an end of transaction has been encountered occurs. If an end of transaction has been encountered, control transfers to operation 712. If transaction is not complete, control passes to operation 708, and a determination is made as to whether a nested transaction interference occurs. When no interference occurs, control returns to operation 702 and continues assigning speculative cache versions to requested transactions.

When, however, a nested transaction interference is detected at operation 708, the interfered transaction level is determined and the corresponding cache version is invalidated at operation 710. Further, if the interfered transaction has nested transactions inside it, the nested transactions inside the interfered transaction are also invalidated. In at least one embodiment, the information about transaction relationships recorded at operation 708 is used to identify the nested inferior transactions of the interfered transactions and the corresponding cache versions and cache version IDs. In at least one embodiment, a transaction restart point is initially identified as the beginning of the interfered transaction. At operation 711, cache versions have been invalidated, and execution is restarted at the identified transaction restart point. Control then returns to operation 702, restarts execution of rolled back transactions, assigning cache versions to newly started transactions.

Referring back to operation 707, when the transaction is complete a determination as to whether a nested or outer transaction has completed is performed at operation 712. When a nested transaction is determined to be completed, an enclosing transaction's cache version is determined at operation 715. In addition, a determination is made as to whether any outer transactions of an interfered transaction have resumed execution after the completion of the interfered transactions, in accordance with operation 715. If one or more transactions have resumed execution after the interfered transaction, the transaction restart point may be identified to be the beginning the outermost transaction that has resumed after the interfered transaction. At operation 717, re-assignment of an outer transaction's cache version is performed and control returns to operation 702 to continue assigning speculative cache versions to requested transactions. Accordingly, information recorded in accordance with steps 708, 715 and 717 is used to make this determination.

When, however, an outer transaction is determined to be completed at operation 712, inferior transactions and outer transactions are determined at operation 714. At operation 716, the inferior transactions are marked as completed. At operation 718, speculative cache versions are committed on the outermost transactions and all inferior transactions committed to the outermost transactions. At operation 720, cache versions corresponding to the outermost transactions and the inferior transactions committed to the respective outermost transactions are marked as available, and the method ends at operation 722.

In accordance with at least one non-limiting embodiment, cache versions are assigned using one or more software instructions from among the allocated speculative ID numbers. Further, when an interference between operations associated with different cache versions is identified in accordance with step 708, control passes to a programmable sequence to resolve conflicts between cache versions in accordance with the present invention. In accordance with embodiment, the programmable sequence can be included with the application code, event based branch handler, operating system code, supervisor code, hypervisor code, firmware, millicode, or another privileged or non-privileged code execution environment.

Further, in accordance with at least one embodiment, management of speculative IDs is performed in accordance with a programmable code sequence. The programmable sequence can be included with the application code, event based branch handler, operating system code, supervisor code, hypervisor code, firmware, millicode, or another privileged or non-privileged code execution environment.

Figure 8:
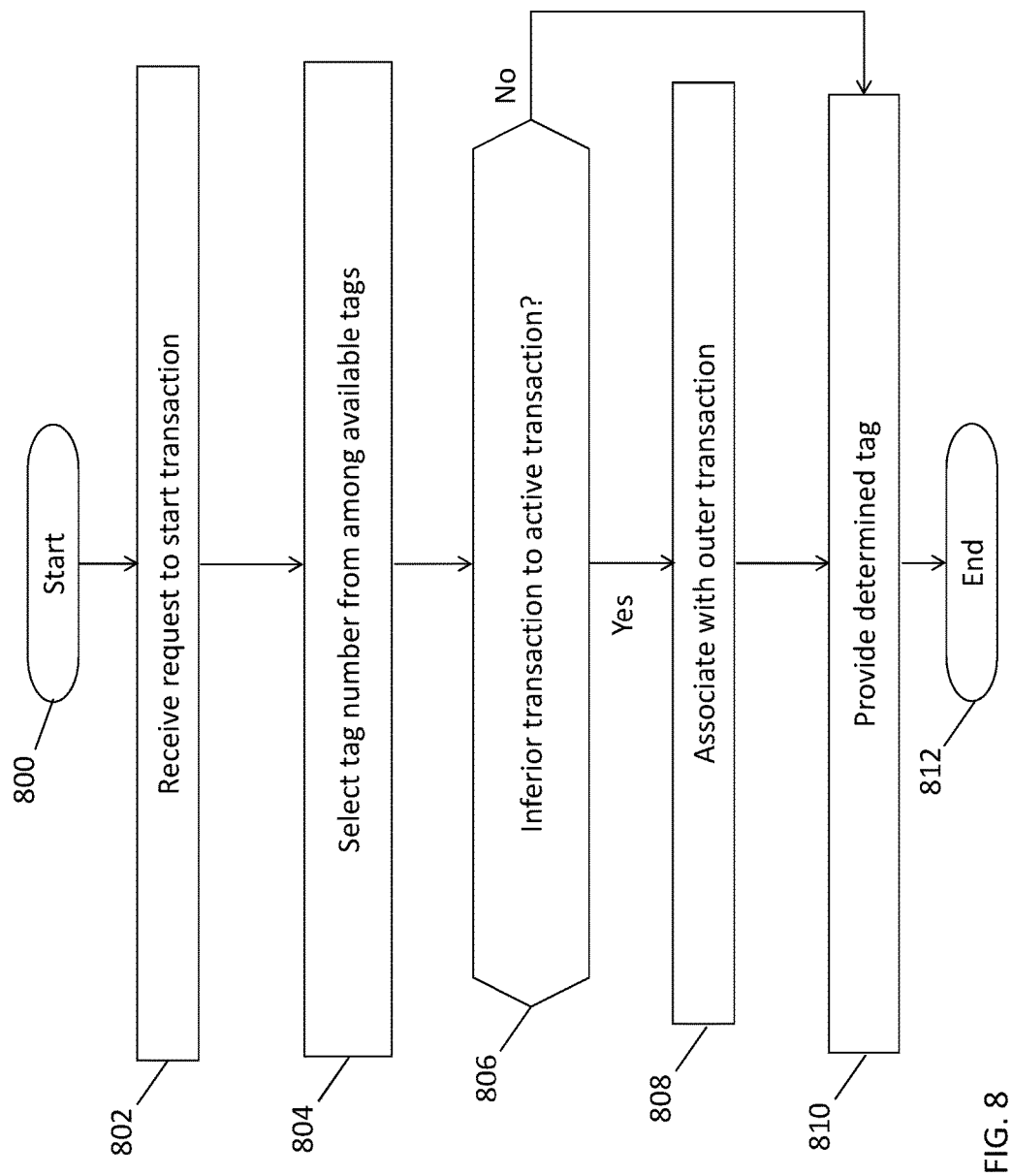
FIG. 8 is a flow diagram illustrating a method of allocating a transaction identification (ID) based on a cache tagging scheme according to a non-limiting embodiment.

Turning now to FIG. 8, a method of allocating a transaction identification (ID) based on a cache tagging scheme of the node chip 50 is illustrated according to a non-limiting embodiment. The method further records a record of nesting relationships, e.g., in accordance with step 706 of FIG. 7, e.g., when a new tag is allocated within an active transaction to be assigned to a nested transaction to be initiated within the active transaction.

The method begins at operation 800, and at operation 802 a request to start a transaction is received. At operation 804, a cache tag number is selected from available cache tag numbers. The available tag number may correspond to one ID from a possible 128 IDs for identifying software threads executed by the node chip 50, and memory operations performed in accordance with application code. In at least one embodiment, the selected ID numbers must be from among those assigned to the processing of transactions.

At operation 806, determination is made as to whether a transaction is currently active, in order to determine whether the transaction for which a tag is to be assigned is an inferior (nested) transaction relative to the currently active transaction. When the present transaction is an inferior transaction, i.e., nested within the currently active transaction, control passes to step 808. Otherwise, control is transferred to step 810.

In operation 808, a relationship of the transaction presently being allocated a tag as a nested transaction of the presently active instruction is recorded (i.e., a record is created to associate the newly allocated cache version tag as corresponding to a transaction nested inside the currently active transaction is created).

At operation 810, the selected cache tag is provided to the requester, and the operation ends at operation 812.

In accordance with at least one embodiment, assignment of speculative IDs of the method of FIG. 8 is performed in accordance with a programmable code sequence. The programmable sequence can be included with the application code, event based branch handler, operating system code, supervisor code, hypervisor code, firmware, millicode, or another privileged or non-privileged code execution environment.

Figure 9:
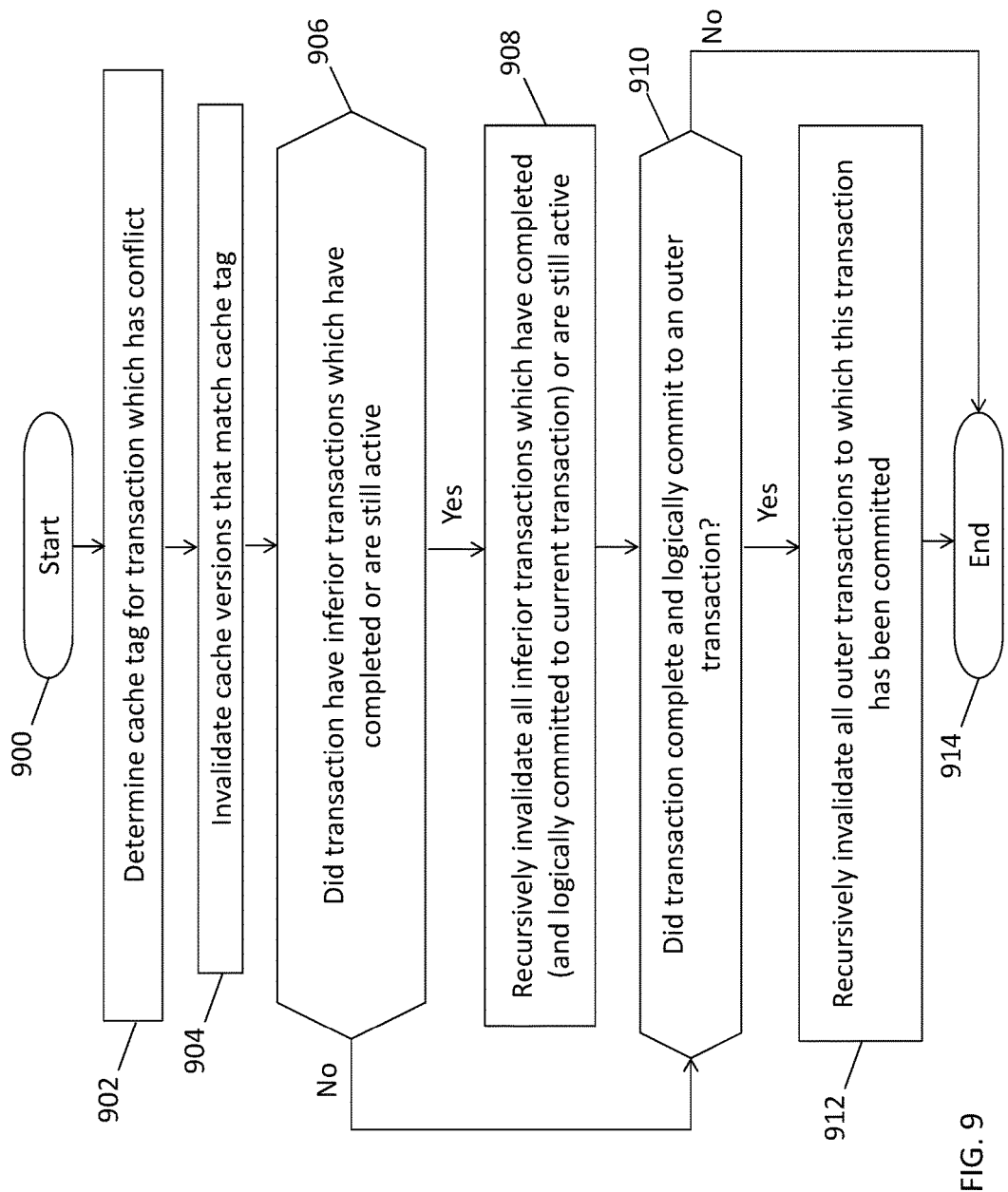
FIG. 9 is a flow diagram illustrating a status word-based transaction monitoring scheme to resolve an interference of nested transactions in a versioning cache according to a non-limiting embodiment.

Turning to FIG. 9, a method illustrates a status word-based transaction monitoring scheme to resolve an interference of nested transactions in a versioning cache according to a non-limiting embodiment. The method begins at operation 900, and at operation 902 a cache tag corresponding to a current transaction undergoing a conflict is determined. At operation 904, cache versions corresponding to the cache tag of the conflicted transaction are invalidated. At operation 906, a determination as to whether the current transactions include inferior transactions of the conflicted transaction of operation 902. In at least one embodiment, the inferior transactions further determined to have completed or are still active. In addition, a determination may be performed at operation 906 as to whether the inferior transactions are logically committed to the current transaction. When the current transaction includes one or more inferior transactions at operation 906, all the inferior transaction which have completed and are logically committed the current transaction or are still alive are recursively invalidated at operation 908, and the method proceeds to operation 910.

When, however, the current transaction excludes an inferior transaction at operation 906, no inferior invalidation process is necessary and the method proceeds to operation 910. At operation 910, a determination is performed as to whether the inferior transaction has completed and is logically committed to an outer transaction included in the current transaction. When the inferior transaction is not committed to an outer transaction, the method ends at operation 914. When, however, the inferior transaction is committed to an outer transaction at operation 910, all outer transactions corresponding to the committed inferior transactions are recursively invalidated at operation 912, and the method ends at operation 914.

In accordance with at least one embodiment, the conflict determination method of FIG. 9 is performed in accordance with a programmable code sequence. The programmable sequence can be included with the application code, event based branch handler, operating system code, supervisor code, hypervisor code, firmware, millicode, or another privileged or non-privileged code execution environment.

Figure 10:
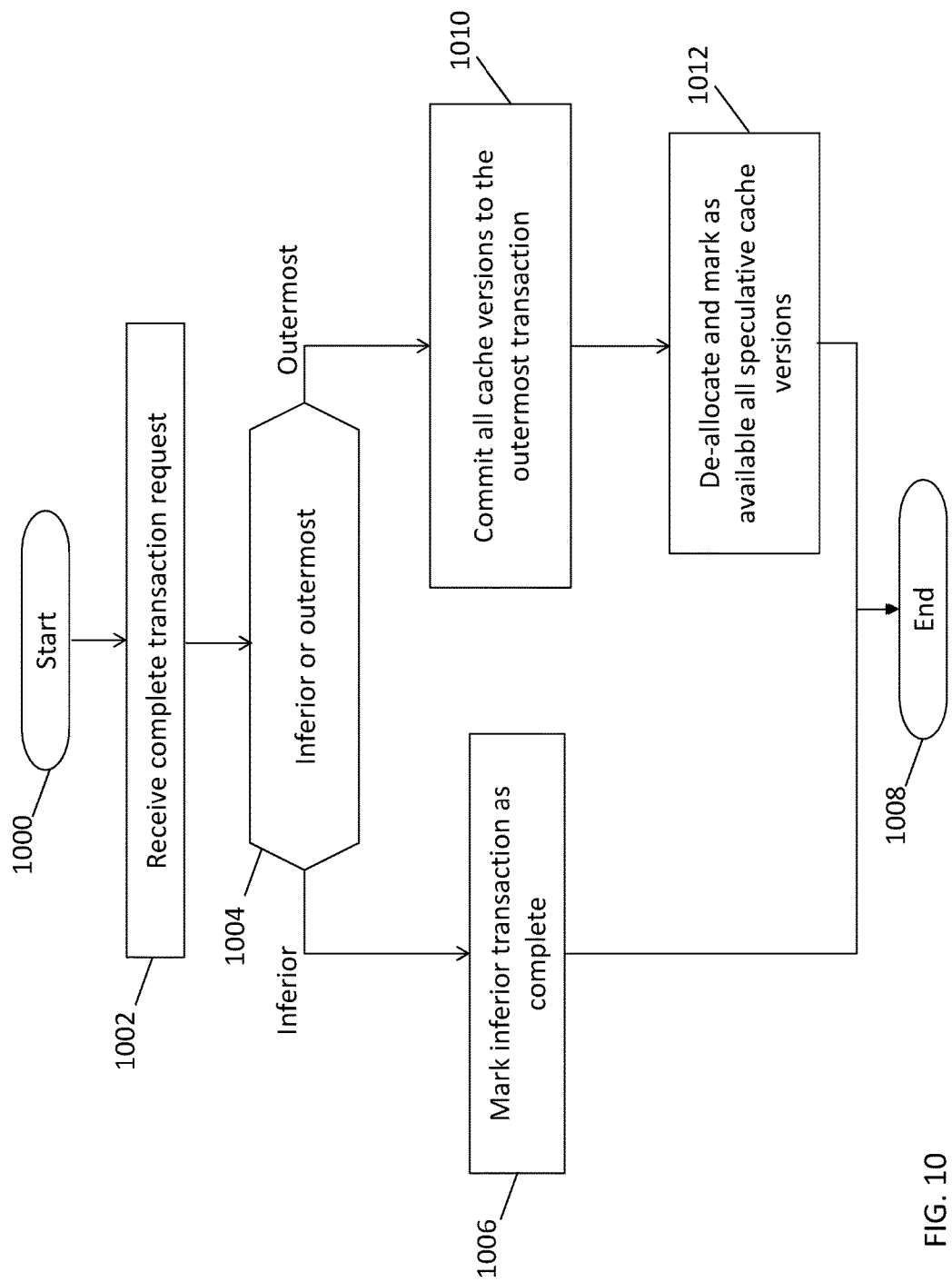
FIG. 10 is a flow diagram illustrating a method of completing an executed transaction including nested transactions implemented in a nested transaction in transactional memory according to a non-limiting embodiment.

Referring now to FIG. 10, a method of completing an executed transaction including nested transactions is disclosed for use in conjunction with a transactional memory embodiment including truly nested transactions according to a non-limiting embodiment. The method begins at operation 1000, and at operation 1002 a request to complete a current transaction is received. At operation 1004, the completed transaction is identified as an inferior transaction or an outermost transaction. When the transaction is identified as an inferior transaction, the inferior transaction is marked as complete at operation 1006, and the method ends at operation 1008.

When, however, the transaction is identified as an outermost transaction, all cache versions are committed to the outermost transaction at operation 1010. In at least one embodiment, any remaining inferior transactions still active are deemed committed to the outermost transaction. At operation 1012, all speculative cache versions are de-allocated and marked as available, and the method ends at operation 1008.

In accordance with at least one embodiment, the transaction completion method of FIG. 10 is performed in accordance with a programmable code sequence. The programmable sequence can be included with the application code, event based branch handler, operating system code, supervisor code, hypervisor code, firmware, millicode, or another privileged or non-privileged code execution environment.

As used herein, the term "module" refers to an application specific integrated circuit (ASIC), an electronic circuit, an electronic computer processor (shared, dedicated, or group) and memory that executes one or more software or firmware programs, a combinational logic circuit, an electronic hardware controller, a microprocessor, and/or other suitable components that provide the described functionality. When implemented in software, a module can be embodied in memory as a non-transitory machine-readable storage medium readable by a processing circuit and storing instructions for execution by the processing circuit for performing a method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of implementing a nested transaction in transactional memory, the method comprising:
    identifying at least one nested transaction in a memory unit, determining a first cache version indicating a cache line that has been updated speculatively, and assigning the first speculative cache version to the at least one nested transaction;
    detecting a conflict with the at least one nested transaction, determining a conflicted nesting level of the at least one nested transaction, and determining a second speculative cache version corresponding to the conflicted nesting level; and
    invalidating the second speculative cache version corresponding to the conflicted nesting level, wherein the invaliding comprises:
    assigning a cache version tag to the at least one nested transaction, the cache version tag identifying the at least one speculative cache version, and wherein detecting the conflict further comprises:
    detecting a request to execute a first transaction, and associating the cache version tag with the first transaction;
    identifying the conflict corresponds to the first transaction based on the cache version tag; and
    when the first transaction commits to at least one different outer transaction among the at least one nested transaction, the invalidating operates to:
    invalidate each inferior transaction among the at least one inferior transaction; and
    invalidate each outer transaction among the at least one outer transaction to which the first transaction has committed.

2. The method of claim 1, wherein the software threads manage at least one of transaction creation, interference determination, rollback, and completion, and wherein the computer system includes at least one data cache that supports the transaction memory to cache data of memory locations operable by the computer system, the at least one data cache in electrical communication with circuit logic that is configured to perform at least one operation comprising:
    detecting the conflict with the at least one nested transaction, determining the conflicted nesting level of the at least one nested transaction, and determining the cache version corresponding to the conflicted nesting level; and
    invalidating the second speculative cache version corresponding to the conflicted nesting level in response to a software command to effect the invalidating.

3. The method of claim 1, wherein the method further comprises invalidating the inferior transaction with respect to the outer transaction.

4. The method of claim 1, wherein the method further comprises invalidating all outer transactions in response to determining that the first transaction completed and is logically committed to the outer transaction.

5. The method of claim 1, wherein the method further comprises flattening all remaining transactions in response to detecting that a number of speculative cache versions exceeds a threshold.

6. The method of claim 1, wherein the method further comprises:
- monitoring a number of assigned cache versions and comparing the number of assigned cache versions to a cache threshold; and
- in response to the assigned cache versions exceeding the cache threshold, reassigning a speculative state of a previously completed inferior transaction to a corresponding outer transaction speculative cache version so as to generate an available cache version.

* * * * *